Oct. 14, 1930.　　　　F. W. SCHUBERT　　　　1,778,302
APPARATUS FOR USE IN MANUFACTURING ARTIFICIAL SILK
Original Filed July 30, 1926
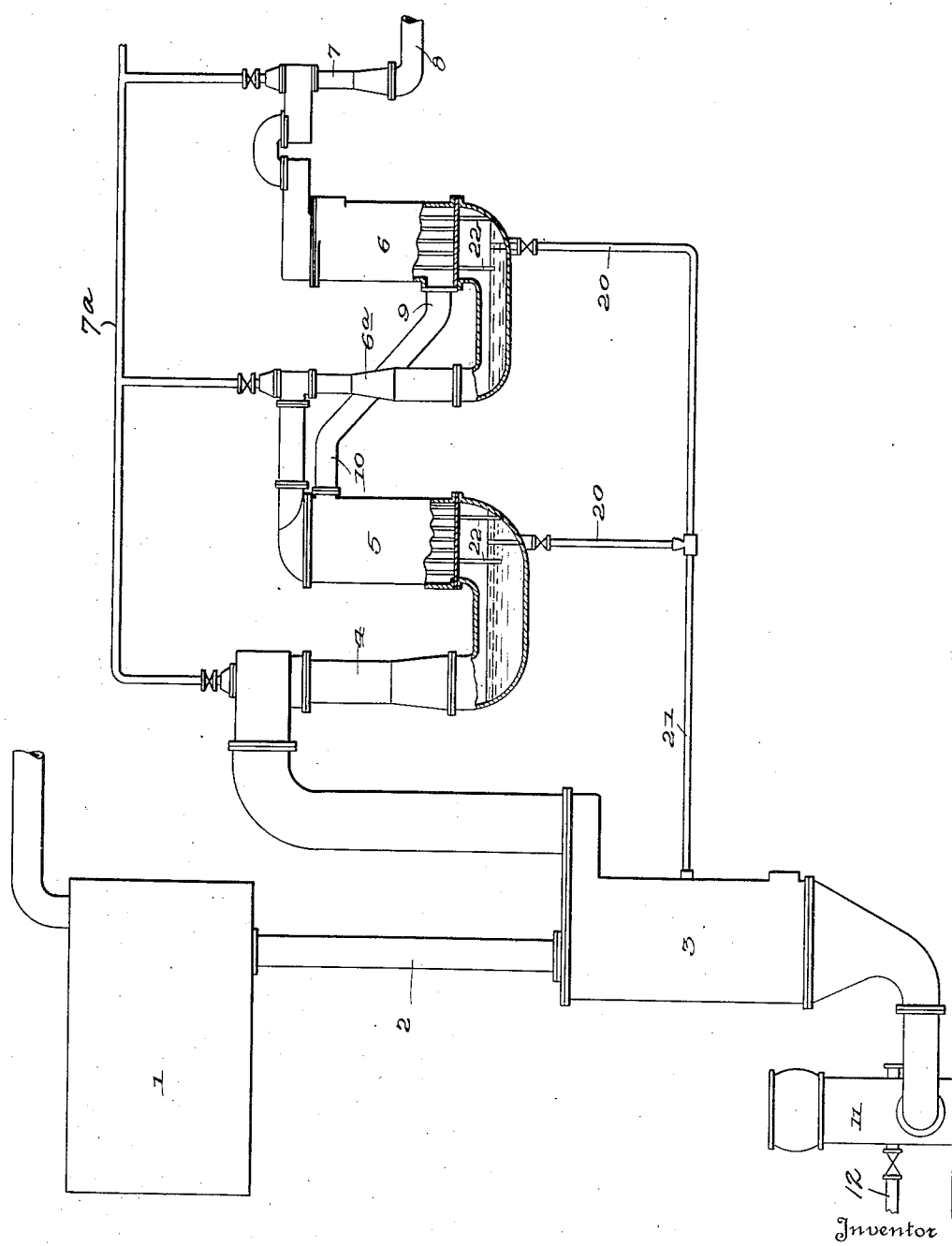
Inventor
Friedrich W. Schubert,
By Cushman, Bryant & Darby
Attorneys Patented Oct. 14, 1930

1,778,302

UNITED STATES PATENT OFFICE

FRIEDRICH WILHELM SCHUBERT, OF APPERLEY BRIDGE, NEAR BRADFORD, ENGLAND, ASSIGNOR TO BRYSILKA, LIMITED, OF APPERLEY BRIDGE, NEAR BRADFORD, ENGLAND

APPARATUS FOR USE IN MANUFACTURING ARTIFICIAL SILK

Original application filed July 30, 1926, Serial No. 125,977, and in Great Britain August 4, 1925. Divided and this application filed July 18, 1928. Serial No. 293,741.

The invention of the present case relates to apparatus for carrying out the method of treating the coagulating liquid employed in the manufacture of artificial silk from cellulose which is described and claimed in a prior application Serial No. 125,977, filed July 30, 1926, of which the present case is a division.

As explained in the earlier, original, application referred to, it is of primary importance in the manufacture of artificial silk from cellulose to maintain the coagulating liquid of a constant temperature, strength and chemical condition.

These desired results are secured by means of the apparatus illustrated in the accompanying drawing.

Referring to the drawing, 1 designates a feed or supply tank for the coagulating liquid, generally water, which may be chemically treated. As shown, the supply tank 1 is relatively elevated and the coagulating liquid passes therefrom through a pipe 2 and an atomizer to a de-aerating vessel 3.

The upper end of the vessel 3 is subject to the action of a multi-stage air ejector which will create and maintain in the vessel 3 a high vacuum.

Preferably, as shown, the vacuum creating means is a three-stage nest ejector and condenser, the first stage 4 being, as before described, in direct connection with the vessel 3 and condensers 5, 6, being, respectively, positioned between said first stage ejector 4 and second stage ejector 6ª and between the latter and the third stage ejector 7. High pressure steam is supplied to the ejectors 4, 6ª, and 7, from a pipe 7ª and the steam employed in the last stage ejector 7 is discharged to the atmosphere through a pipe 8.

As the liquid is continuously supplied to the vessel 3 from the tank 1 it will be brought under the influence of the high vacuum created by the multi-stage air ejector and the free oxygen in the liquid will be withdrawn. The creation of vapor under the action of the vacuum will extract a certain amount of heat from the liquid, thereby cooling it and the cooled liquid is withdrawn from the lower end of the vessel 3 by a suitable pump 11.

The air and vapor drawn from the vessel 3 by the first stage air ejector 4 passes through an intercooler 5, wherein the temperature of such air and vapor is reduced and the resulting condensed liquid is returned to the vessel 3 through the conduits 20, 21.

The uncondensed vapor and steam drawn from the upper end of the cooler 5 is under the action of the second stage air ejector 6ª caused to pass into a second intercooler 6 located between the second and third stages of the vacuum creating means and the liquid condensed by the action of said intercooler 6 is, as shown, returned to the vessel 3.

Any vapor which passes the second cooler 6 is by the action of the third stage ejector 7 discharged to the atmosphere.

The intercoolers 5, 6, as shown, are each surrounded by suitable water jackets through which cooling water is circulated by pipes connecting outlets 10 and inlets 9 of such jackets.

Suitable means may be provided whereby the liquid in the vessel 3 may be maintained at the desired temperature, which, it will be noted, is less than the ordinary or normal temperature of the liquid supplied through the pipe 2.

As shown, each of the intercoolers 5, 6, has certain of its condensation tubes extended downward as shown at 22 to a point below the level of the condensed liquid and the drain connections 20 are extended upward sufficient to maintain the condensed liquid at a predetermined depth. By this means any liquid which may be carried into the upper header of either cooler will drain back into the bottom header as the tubes 22 extend below the surface of the liquid collected in such header.

The pump 11 may be of any suitable construction and is preferably adapted to withdraw the cooled and de-aerated liquid from the vessel 3 and discharge it at a pressure of say twenty-five pounds (25 lbs.) through a discharge pipe 12 to a suitable tank or reservoir from which it can be delivered to the spinning apparatus.

It will be understood that the drawing is more or less diagrammatic and that there can be variation from some of the details shown without departing from the invention.

While the operation of the apparatus will be clear from the foregoing in connection with the drawing, it may be briefly stated as follows.

The coagulating liquid, generally water, which may have been treated with suitable chemicals, is continuously passed through the de-aerating vessel 3 and in its passage is subjected to the action of the high vacuum created by the multi-stage air ejector which effectively removes or withdraws the free oxygen from such liquid without, however, raising the temperature of the liquid or varying the strength or chemical condition thereof.

It has been heretofore proposed to de-aerate the coagulating liquid employed in the manufacture of artificial silk from cellulose, but the means for effecting this have not been as satisfactory as those herein described.

The apparatus heretofore used for this purpose has commonly included means whereby the temperature of the liquid was raised, but this is objectionable because first, it necessarily results in varying the strength or chemical condition of the liquid, and, secondly, the liquid should not exceed a certain temperature when acting upon the cellulose, and therefore it has been generally necessary to provide some auxiliary refrigerating means for cooling the liquid after it has passed from the de-aerating vessel.

Long experience has shown that fluctuations in strength, temperature, or oxygen content of the coagulating liquid, however small, are immediately reflected on the filaments treated thereby, and it is known that as the temperature of the coagulating liquid is increased, the drawing out or coagulating zone thereof is shortened. It is very desirable, therefore, to avoid raising the temperature of the liquid during the de-aerating step, and also to maintain the liquid at a relatively low temperature at all times.

With the apparatus herein described it is possible to use well water as the coagulating liquid, which has the advantage of being at constant temperature, and not influenced by temperature fluctuations like other water, and to withdraw the free oxygen therefrom, by the particular vacuum means referred to, without raising the temperature of such water in its passage through the vessel 3.

The apparatus provides a means by which the temperature, strength, and chemical condition of the coagulating liquid may be maintained constant and subject to very accurate control.

I claim:

In an apparatus for deaerating the coagulating liquid employed in the manufacture of artificial silk from cellulose, the combination of a vacuum vessel, means for supplying the coagulating liquid to said vessel in atomized form, means for maintaining a high vacuum in said vessel, whereby the atomized liquid will be deaerated without raising the temperature of the liquid, and condensing means arranged to act upon the vapor separated from the liquid in the vacuum vessel and comprising a casing provided at its lower end with a space for condensed liquid and having a series of substantially vertical vapor conduits rising from said space, a cooling jacket surrounding said conduits above the condensed liquid space, one or more of the vapor conduits extending downward below the level of condensed liquid in said space, and a conduit for returning liquid from said space to the vacuum vessel having its inlet above the level of the lower ends of the vapor tube or tubes extending into said space.

In testimony whereof I have hereunto set my hand.

FRIEDRICH WILHELM SCHUBERT.